(12) United States Patent  
Kaiba et al.

(10) Patent No.: US 9,033,464 B2
(45) Date of Patent: May 19, 2015

(54) PRINTING APPARATUS

(71) Applicant: LAC CORPORATION, Tokyo (JP)

(72) Inventors: Tadashi Kaiba, Tokyo (JP); Shuusei Murai, Tokyo (JP)

(73) Assignee: LAC CORPORATION, Tokyo (JP)

( * ) Notice: Subject to any disclaimer, the term of this patent is extended or adjusted under 35 U.S.C. 154(b) by 0 days.

(21) Appl. No.: 14/322,209

(22) Filed: Jul. 2, 2014

(65) Prior Publication Data

US 2015/0009254 A1 Jan. 8, 2015

(30) Foreign Application Priority Data

Jul. 4, 2013 (JP) ................. 2013-140545
Jul. 22, 2013 (JP) ................. 2013-151336

(51) Int. Cl.
*B41J 23/00* (2006.01)
*B41J 2/14* (2006.01)
*B25J 11/00* (2006.01)

(52) U.S. Cl.
CPC ............... *B41J 2/14* (2013.01); *B25J 11/0075* (2013.01); *Y10S 901/43* (2013.01)

(58) Field of Classification Search
CPC .......... B41J 2/2146; B41J 3/543; B41J 2/155; B41J 25/001
USPC ............................................. 347/9, 12, 37–39
See application file for complete search history.

(56) References Cited

U.S. PATENT DOCUMENTS 7,604,848 B2* 10/2009 Iwata ............................ 427/542
8,348,384 B2* 1/2013 Sato et al. ...................... 347/38

* cited by examiner

*Primary Examiner* — An Do
(74) *Attorney, Agent, or Firm* — Wenderoth, Lind & Ponack, L.L.P.

(57) ABSTRACT

A printing apparatus which is capable of printing a pattern and/or a character on a curved printed surface, such as an airframe surface of a passenger aircraft, in a very short time. A head array having therein a plurality of inkjet nozzles for ejecting ink toward a remote position by supplying pressurized air to ink tanks filled with the ink, respectively, is mounted on a linear array so as to be able to perform linear reciprocation, the linear rail being held by a robot arm of a multi-articulated robot 5, and a position at which the robot arm 5a is to be disposed is controlled on the basis of position information, while controlling of driving of predetermined nozzles in the head array is performed in association with the position information.

3 Claims, 7 Drawing Sheets

PRINTING APPARATUS

SUMMARY OF THE INVENTION

The present invention relates to a printing apparatus, and more particularly, to a printing apparatus capable of printing a pattern and/or a character on a curved printed surface, such as a surface of the airframe of a large passenger aircraft, in a short time.

As disclosed in Patent document 1 (U.S. Pat. No. 8,123, 350), a printing apparatus has been proposed in which a head array in which a plurality of nozzles are arranged is held by a robot arm of a multi-articulated robot of the type having six-axes, and the head array is moved to a predetermined targeted position on the printed surface to eject ink from the nozzle or nozzles, thereby applying printing. In a case where the printed surface is formed in a curved surface, the printing apparatus can apply printing on the curved surface by supplying position information of the curved surface to the robot arm.

LIST OF THE PRIOR ART DOCUMENT

Patent Document

[Patent Document 1] The specification of U.S. Pat. No. 8,123, 350

However, in the printing apparatus disclosed in the Patent Document 1, since the printing head array is directly held on the robot arm, there has been a problem such that transmission and reception of the position information from a controller to the robot arm takes unignorable amount of time, and a movement of the printing head driven by the robot arm is a time-consuming operation. As a result, a printing speed must have been so slow that it is difficult to put the printing apparatus to practical use.

Accordingly, in view of the above-described problem, an object of the present invention is to provide a printing apparatus which is capable of achieving a printing of a pattern and/or a character in a very short time even when a targeted surface to be printed is, for example, a curved surface such as an airframe surface of a large passenger aircraft.

In order to achieve the described object, the present invention provides a printing apparatus for printing a pattern and/or a character onto a predetermined target position of a curved printed surface, which includes:

a head array in which there is arranged a plurality of inkjet nozzles configured to eject an ink toward a remote position under a high-pressure by supplying an ink tank filled with the ink with a pressurized air for generating the high-pressure;

a linear rail configured to allow the head array to perform a linear reciprocation thereof;

a multi-articulated robot equipped with a robot arm configured to adequately move the linear rail to a predetermined position and to hold the linear rail at the predetermined position;

a robot arm controller configured to control driving of the robot arm on the basis of position information; and a controller configured to provide the robot arm controller with the position information and to perform driving control of the predetermined inkjet nozzle of the head array in association with the position information.

In order to achieve the described object, the printing apparatus described above is characterized by further including a configuration such that the linear rail is provided with two rails arranged to be orthogonal to one another.

The linear rail can be configured to be a support member attached to the robot arm, and to be movably supported on two vertical linear rails arranged to be attached to right and left leading ends of a bifurcated support member so as to be parallel to one another.

In accordance with the printing apparatus according to the present invention, there is provided such an effect that since the linear rail on which the head array is mounted so as to be able to perform a linear reciprocating motion, is held by a robot arm of the multi-articulated robot, it is possible to perform printing at a speed of several hundred times as compared to the conventional printing apparatuses.

Furthermore, according to the printing apparatus of the present invention, there is such an effect that it is possible to quickly and accurately perform a uniform printing, even if the targeted and printed surface is, for example, a curved surface such as an airframe surface of a large passenger aircraft.

DETAILED DESCRIPTION

Figure 1:
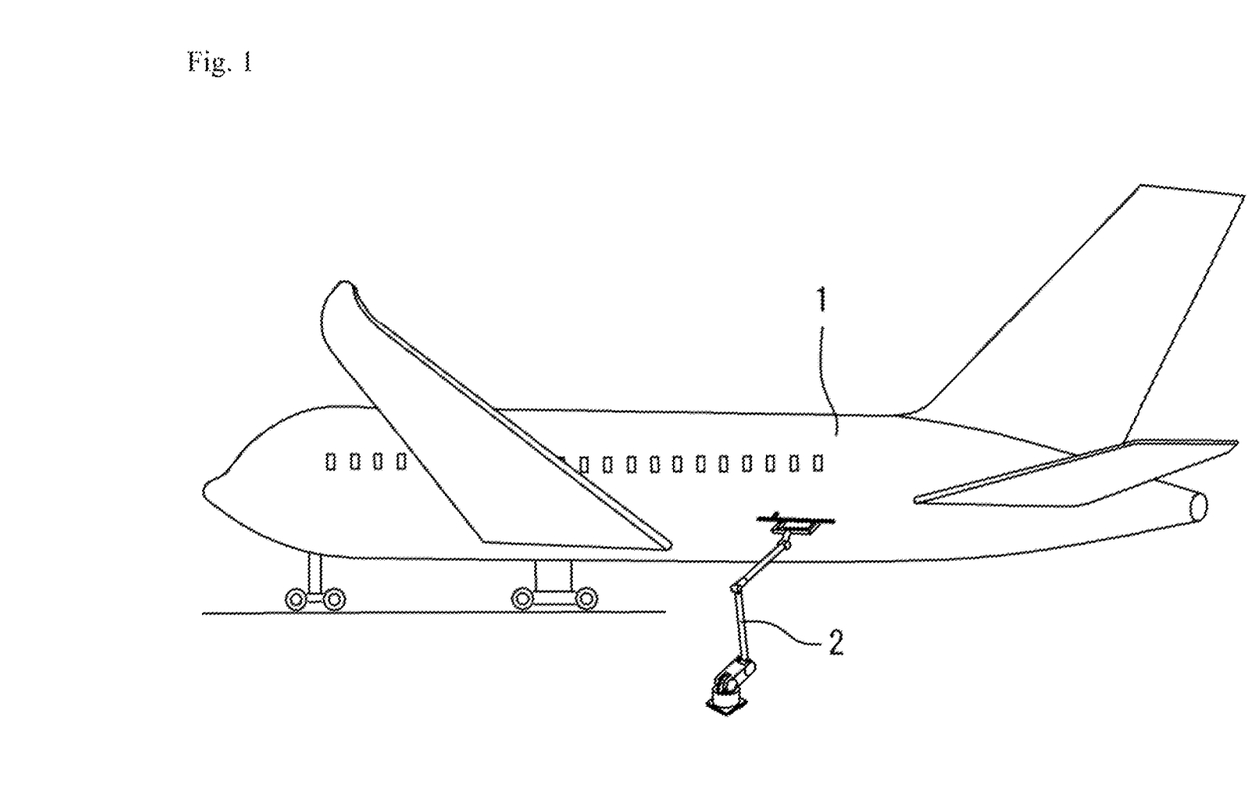
FIG. 1 is a general overall view of a printing-operation site which illustrates a state of printing a large passenger aircraft carried out by a printing apparatus according to the present invention.

A detailed description of a printing apparatus according to one preferred embodiment of the present invention will be provided hereinbelow, with reference to the accompanying drawings. FIG. 1 is a general perspective view which illustrates and explains an operating site where printing of a large passenger aircraft is performed by employing a printing apparatus according to the present invention, FIG. 2 is a perspective view illustrating the printing apparatus according to the preferred embodiment of the present invention, and FIG. 3 is a diagrammatic view which illustrates a constitution of a robot arm controller and that of a controller.

FIRST EMBODIMENT

Figure 2:
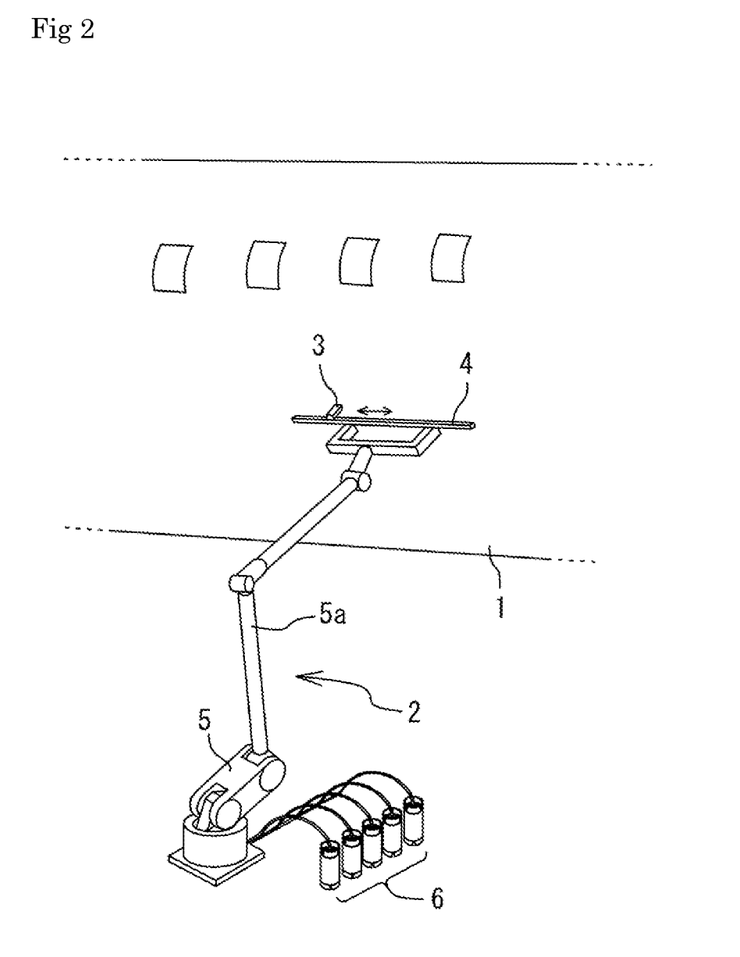
FIG. 2 is a perspective view illustrating the printing apparatus according to an embodiment of the present invention.
Figure 3:
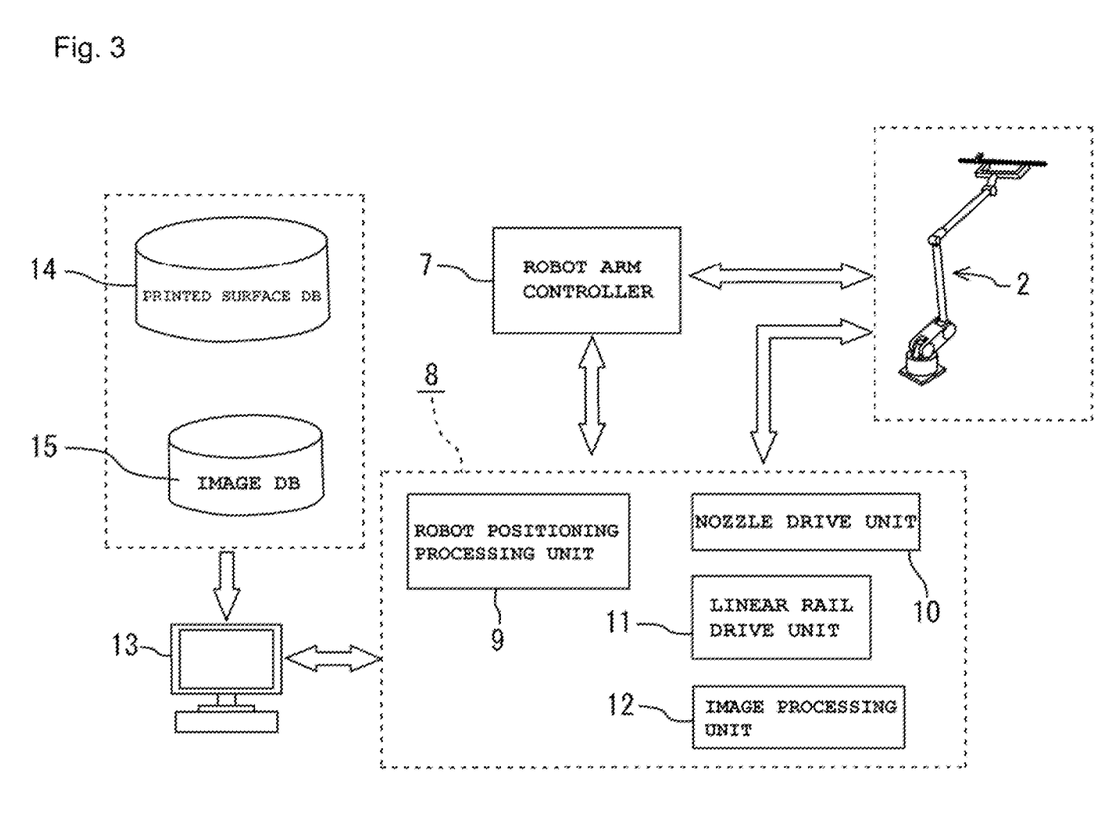
FIG. 3 is a diagrammatic view illustrating a constitution of a robot arm controller and a controller.

Schematically, a printing apparatus 2 illustrated in FIG. 2 as an embodiment of the present invention is generally provided with a head array 3 in which there are arranged a plurality of inkjet nozzle groups in an inkjet nozzle group assembly 16 (see FIG. 4) configured to perform ejection of an ink toward a remote position when supply of pressurized air to a group of ink tanks 6 filled with an ink, respectively, is carried out, a linear rail 4 provided for permitting the head array 3 to make a linear reciprocation therealong, a multi-articulated robot 5 equipped with a robot arm 5a that appropriately moves the linear rail 4 to a predetermined targeted position to thereby hold the linear rail 4 at the targeted position, a robot arm controller 7 provided for controlling drive of the robot arm 5a on the basis of position information, as illustrated in FIG. 3, and a controller 8 provided for supplying the position information to the robot arm controller 7 while performing drive control of predetermined inkjet nozzle or nozzles in a nozzle group assembly 16 of the head array 3 in association with the position information.

The multi-articulated robot 5 is a mechanical device that is equipped with the robot arm 5a which allows a free movement like an arm of a human body by means of a plurality of joints, and is able to freely move a leading end of the robot arm 5a so as to correctly bring the leading end to an objective position. As the multi-articulated robot 5, for example, it is possible to employ a six-axis control type industrial robot equipped with six axes of control, namely, six joints. According to the six-axis type multi-articulated robot, by teaching information about the operation in advance, it is possible to move the linear rail 4 very precisely and rapidly to a position where it faces a predetermined targeted position of a printed surface 1, as will be described later in more detail. It should, however, be noted that the multi-articulated robot 5 is not limited to one having six axes of control, and it is possible to employ the multi-articulated robot having an appropriate more or less number of axes of control, for example, five axes, seven axes, or the like. Furthermore, since the multi-articulated robot per se is well-known in the art, the detailed description thereof will be omitted here.

Figure 4:
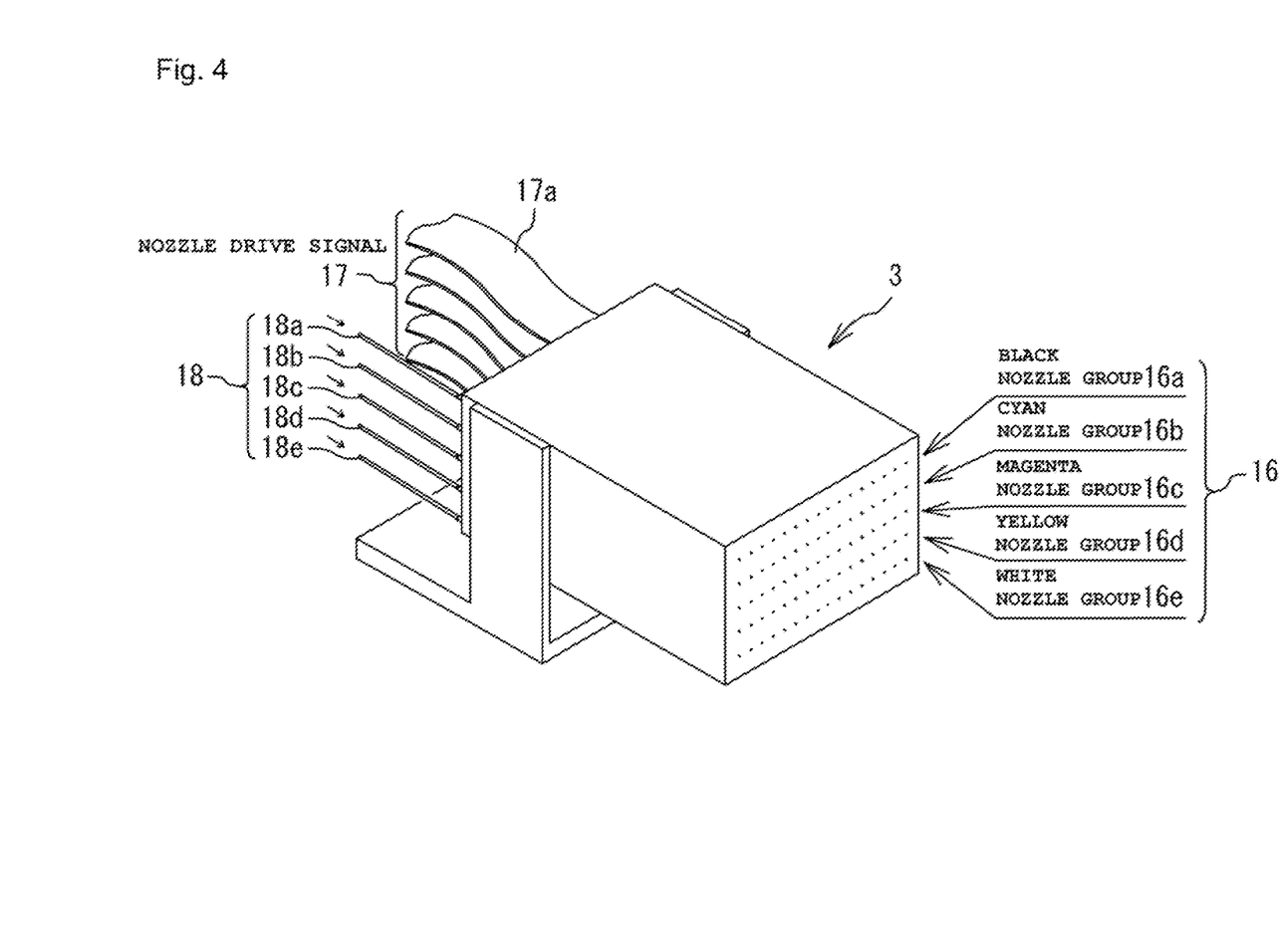
FIG. 4 is an explanatory perspective view illustrating a configuration of a head array.

The head array 3 is a suitable means or device that can perform printing on the printed surface 1 by carrying out ejection of the ink of a predetermined color from the nozzles, and as illustrated in FIG. 4, the nozzle group assembly 16, each group having a plurality of built-in nozzles, is provided so as to eject ink of each color of black, cyan, magenta, yellow, and white. The nozzle group assembly 16 has a black nozzle group 16a in which a plurality of nozzles provided so as to eject black ink are arranged in a row, a cyan nozzle group 16b in which a plurality of nozzles provided so as to eject cyan ink are arranged in a row, a cyan nozzle group 16c in which a plurality of nozzles provided so as to eject magenta ink are arranged in a row, a yellow nozzle group 16d in which a plurality of nozzles provided so as to eject yellow ink are arranged in a row, and a white nozzle group 16e in which a plurality of nozzles provided so as to eject white ink are arranged in a row.

Figure 5:
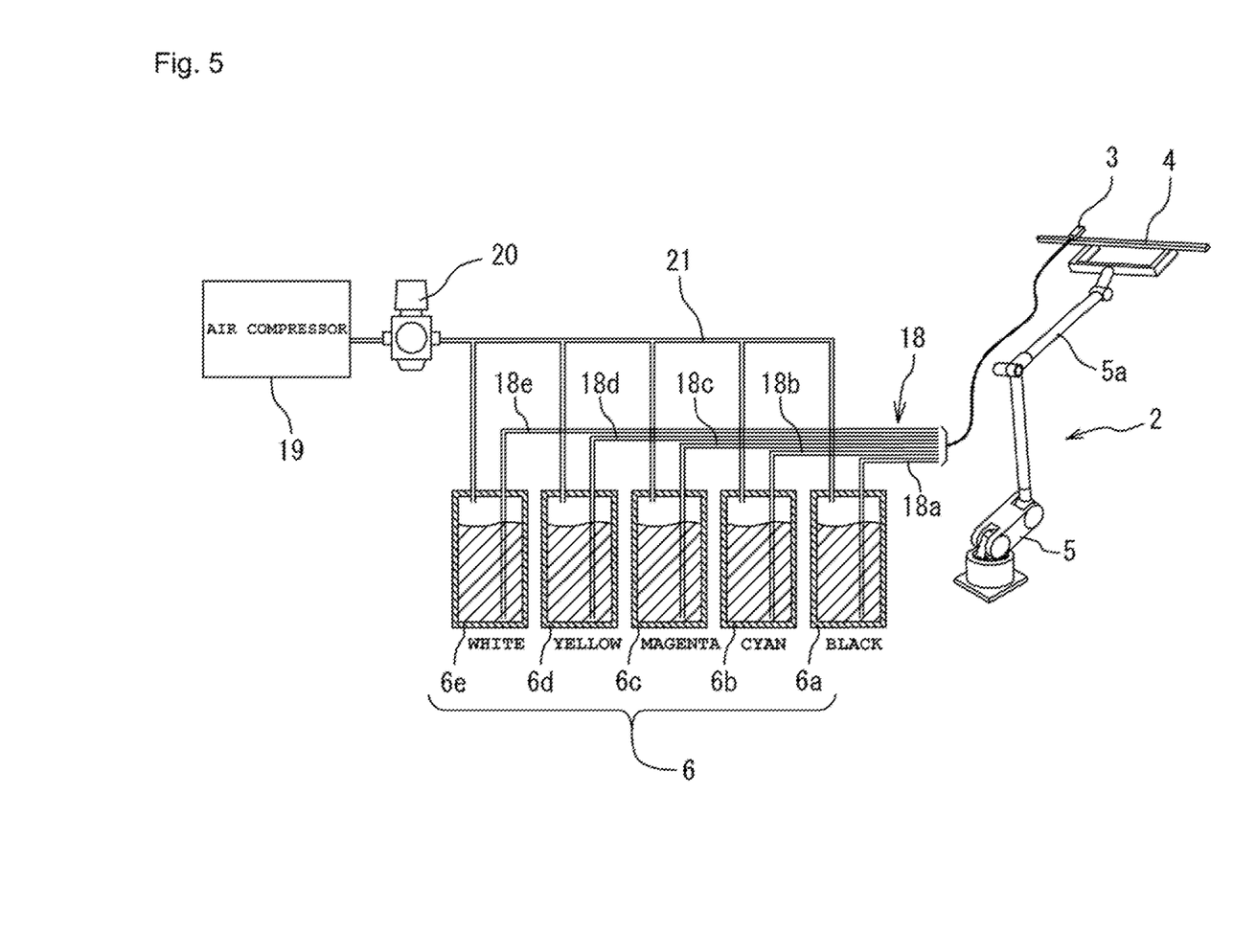
FIG. 5 is a diagrammatic view, in part cross-section, illustrating a configuration of inkjet nozzles and ink tanks.

As best shown in FIG. 5, each group of the nozzle group assembly 16 mounted in the head array 3 is in fluid communication with the ink tank group assembly 6 having tanks that are filled with respective color inks of black, cyan, magenta, yellow, and white by way of a tube assembly 18. Specifically, an ink tank black 6a filled with black ink is in fluid communication with the black nozzle group 16a byway of a tube element 18a, an ink tank cyan 6b filled with cyan ink is in fluid communication with the cyan nozzle group 16b by way of a tube 18b, an ink tank magenta 6c filled with magenta ink is in fluid communication with the magenta nozzle group 16c by way of a tube 18c, an ink tank yellow 6d filled with yellow ink is in fluid communication with the yellow nozzle group 16d by way of a tube 18d, and an ink tank white 6e filled with white ink is in fluid communication with the white nozzle group 16e by way of a tube 18e. Moreover, the pressurized air from a suitable air compressor 19 is adjusted to a predetermined pressure level by an air regulator 20 and is adapted to be supplied to each of the ink tank group assembly 6 by way of a pipe 21.

The afore-mentioned robot arm controller 7 includes an electronic circuit that can control the operation of the robot arm 5a on the basis of the preliminarily taught position information that has been provided in advance. Moreover, the position information is adapted to be delivered to the robot arm controller 7 from the controller 8.

The controller 8 as shown in FIG. 3 is provided with a robot positioning processing unit 9 that can process data of the positioning information of the robot arm 5a, a nozzle drive unit 10 that can operate each of the nozzle group assembly 16 provided in the head array 3, a linear rail drive unit 11 that can position the head array 3 at a predetermined targeted position, and an image processing unit 12 that can process data of an image of print content to be printed on the printed surface 1.

The controller 8 is connected to a so-called conventional type personal computer (PC) 13, and a non-illustrated storage device of the PC 13 is provided therein with a printed surface database unit (printed surface DB) 14 that can record and store data of information of a printed surface 1 such as a curved surface data (3D shape data) of an external surface 1 of an airframe of a large passenger aircraft as the printed surface 1, and an image database (image DB) 15 that can record and store the image data for specifying the print contents to be printed on the printed surface 1. That is, the necessary information, such as the image data to be printed onto the printed surface 1 and a curved surface state of the printed surface 1, is inputted to the PC 13. Moreover, the PC 13 is configured to perform an operation of association between the position information and the image data of the printed surface 1, based on the curved surface data (3D shape data) of the input printed surface 1 and the image data for specifying the print contents, to thereby specify what sort of printing manner and which position on the printed surface 1 an image is to be printed at, based on the image data, and to deliver the data of information about the associated position information and image data to the controller 8.

Based on the associated position information and the information about the image data delivered to the controller 8, the image processing unit 12 performs processing of the image of the print contents to be printed onto the printed surface 1, the robot positioning processing unit 9 brings the robot arm 5a to a predetermined targeted position via the robot arm controller 7, the linear rail drive unit 11 positions the head array 3 at a predetermined position, and the nozzle drive unit 10 operates each of the nozzle group assembly 16 mounted in the head array 3. Thus, the movement and positioning of the robot arm 5a to a predetermined targeted position and the movement of the nozzle group assembly 16 in the head array 3 are performed in association with each other. That is to say, the nozzle drive signal 17 is transmitted to the head array 3 from the nozzle drive unit 10 via a cable 17a in FIG. 4, meanwhile, the pressurized air is fed from the air compressor 19 equipped with the air regulator 20 through an ink tank pressure air pipe 21 in FIG. 5, stable high-pressure air is applied to the ink tank group assembly 6, the ink is supplied from the respective ink tanks 6a to 6e via the respective tube elements 18a through 18e, and the ejection of the ink of each color toward a predetermined targeted position of the printed surface 1 is performed in response to the nozzle drive signal 17.

In a case of a printing apparatus in which a head array is directly attached to the robot arm illustrated as a conventional example, it takes 50 ms to 150 ms to complete transmission of the position information to the robot arm from the robot arm controller. Furthermore, the time required for the robot arm to move to a predetermined targeted position requires 10 ms to 100 ms, even if it moves to a quite close position of the targeted position. Therefore, in order to eject the predetermined ink from the nozzles of the head array at a certain predetermined position and eject the next predetermined ink from the nozzles of the head array by moving the robot arm to a next predetermined position, the time of average 200 ms is required even if the drive time of the nozzles is not taken into account.

That is, in the case of the printing apparatus of the related art in which the head array is directly held by the robot arm, for example, it might be possible to accurately move the head array from a point A to a point B separated from each other by 1 m. However, the trace of movement of the head array by the robot arm is often not constant but is frequently dispersed, and therefore, it is not possible to correctly grasp and manage the movement speed and the movement distance of the head array in the distance of 1 m. Therefore, it is not possible to strike a number of dots at correct positions and at a correct minute interval in the middle of the movement from point A to point B. Accordingly, in order to strike the dots at the correct position, the time of approximately 200 mS must be required for the exchange of the position signals and the movement of the robot arm, namely, the head array.

In contrast, in case of the printing apparatus according to the present invention as illustrated in the above-described embodiment, the head array 3 is mounted on the linear rail 4, and the robot arm 5a holds the linear rail 4. The linear rail 4 is arranged so as to be able to move the head array 3 on the straight line at high speed and to be able to precisely control the position of the head array 3. Hereinafter, there is provided a description of difference in times required for printing by the printing apparatus according to the present invention and by the printing apparatus of the related art, based on the above-described difference in operation of the printing apparatus between the related art and the present invention. It should here be understood that the description will be provided of a case where printing is performed by employing only a single piece of nozzle in the head array so as to simplify calculation of the time required for printing.

When performing the stereotypical printing of all over a curved surface having vertical of about 1 m (1,000 mm), and horizontal width of about 1 m (1,000 mm) by a single piece of nozzle at a resolution of 100 DPI (0.254 mm pitch), comparison of required times for printing between the printing apparatus of the related art and that according to the present invention will now be made. The number of dots in the horizontal direction is 1,000 mm divided by 0.254 mm=3,937 dots The number of dots in the vertical direction is 1,000 mm divided by 0.254 mm=3,937 dots The total number of dots of 1 m² is 3,937 times 3,937=15,499,969 dots As described before, since the average 200 ms of time is required for printing the next dot from a certain dot in the printing apparatus of the related art, even if the time required for driving of the nozzle is not taken into account, the total time required for printing is as follows:

3,937×3,937×200 ms=3,099,993 (sec)

When converting this into time, the following is obtained.

3,099,993 sec divided by (60 times 60)=861.1 hours

That is, it takes 861.1 hours.

In case of the printing apparatus according to the present invention, approximately 2 sec is enough for the linear rail 4 to laterally move the head array 3, namely, a predetermined nozzle at an accurately constant speed, and approximately 0.5 ms is enough to make striking of the next dot after ejecting one dot by the nozzle, including the transmission time of the nozzle drive signal 17.

Therefore, when the linear rail 4 includes a length of about 1 m, since it moves on the line of about 1 m in 2 sec, the number of dots struck in 2 sec is as follows.

2 s divided by 0.5 ms=4,000

That is to say, it is possible to strike 4,000 dots in 2 sec at equal intervals. Moreover, 3,937 dots are struck in one line at 100 DPI. If it takes 2 seconds to strike a dot of one line, the time in 3,937 lines can be indicated below:

3,937 times 2 sec=7,874 sec

That is to say, it takes 7,874 sec.

In addition, if the average 200 ms is required for driving the robot arm 5a so as to move the head array 3 to the next line from a certain line, the required driving time will be indicated below:

3,937 times 0.2 (sec)=787.4 sec.

Therefore, the required total time results in that indicated below:

7,874 sec+787.4 sec=8661.4 sec

When converting this into time, the following is obtained.

8661.4 divided by (60×60)=2.4 hours

That is to say, the time is 2.4 hours in case of the printing apparatus according to the present invention, and it can be understood that it is possible to actually perform printing at speeds of 358 times compared to the printing apparatus of the related art. However, since the number of nozzles held by the head array 3 is actually a plural number, the required printing time of 10 nozzles becomes one-tenth compared to that of the single nozzle, and this will be also the same with regard to the printing apparatus of the related art.

SECOND EMBODIMENT

As described above, in the above-described first embodiment, it is possible to make ejection of an ink by means of the nozzle group assembly 16 to a linearly forward a long distance, by employing the nozzle group assembly 16 capable of ejecting ink to a remote position by supplying the pressurized air to the ink tank groups 6 to apply a highly pressurized air, but there is a limit in a flight distance of the ink. For example, in a case where it is assumed that the ink is to be ejected toward a front position of 100 mm distance, when a difference in distance between the nozzle group assembly 16 and the printed surface 1 is 100 mm or more between a higher position and a lower position of the curved surface, such as the airframe surface of the passenger aircraft, it is often unable to accurately strike the dots on the surface that is located at 100 mm or more distant away from the nozzle group assembly.

Figure 6:
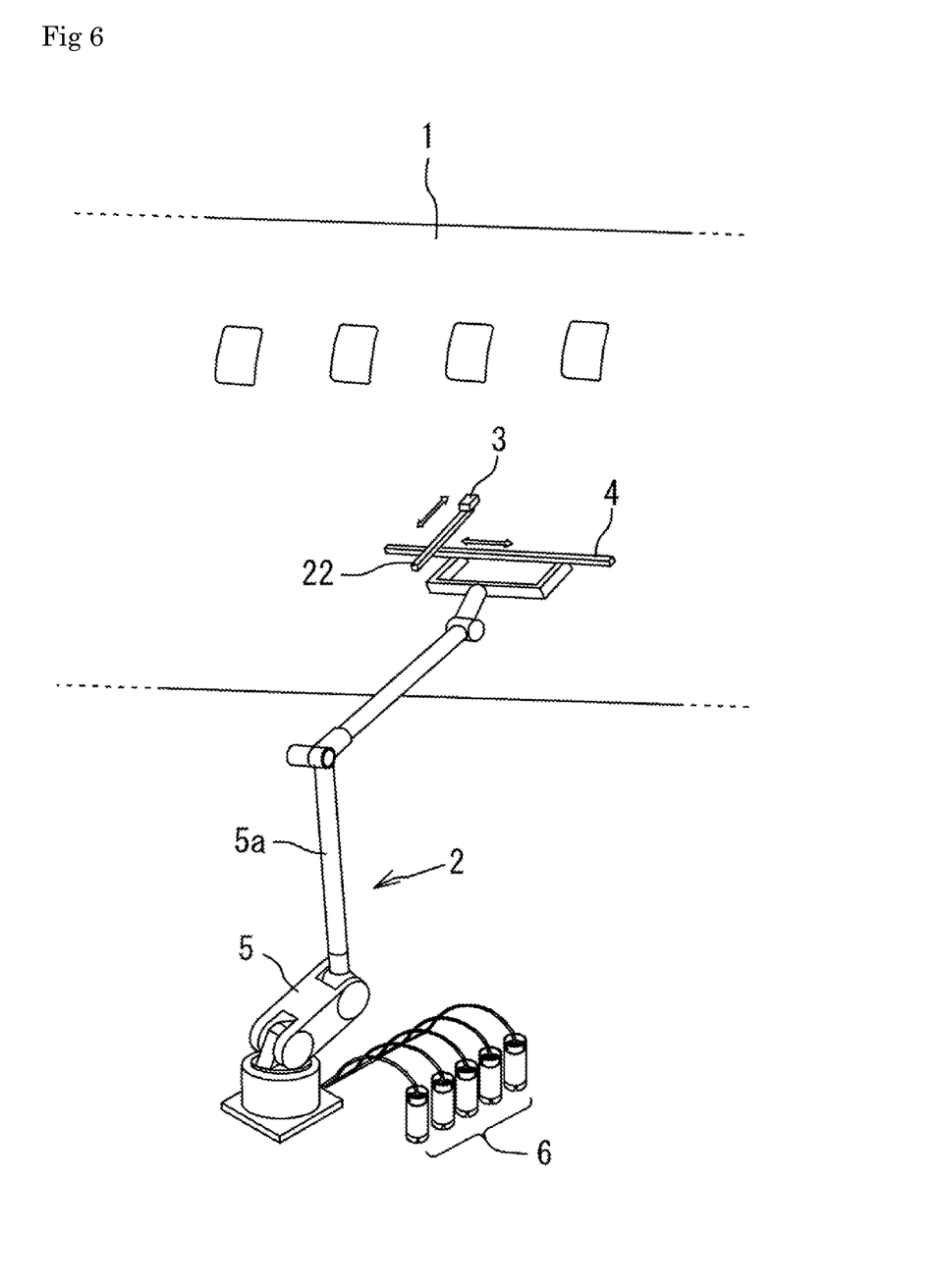
FIG. 6 is a schematic view illustrating and explaining a printing apparatus according to a second embodiment of the present invention.

Therefore, in order to compensate for this, a printing apparatus 2 according to the second embodiment illustrated in FIG. 6 is configured so that, on the linear rail 4, an orthogonal linear rail 22 orthogonal thereto is additionally mounted, and the head array 3 is now held on the orthogonal linear rail 22. Thus, it is possible to compensate for the blurring due to the flight distance of the dots, by keeping a substantially constant distance between the printed surface 1 and the nozzle group assembly 16 by moving the head array 3 back and forth in the direction perpendicular to the lateral direction, while moving the orthogonal linear rail 22 holding the head array 3 in the lateral direction in FIG. 6 on the first linear rail 4. Furthermore, since it takes an additional time for movement control of the orthogonal linear rail 22 in addition to the linear rail 4, in the case of the printing apparatus 2 according to the second embodiment, the printing speed is somewhat lowered as compared to the printing apparatus in the first embodiment.

THIRD EMBODIMENT

Figure 7:
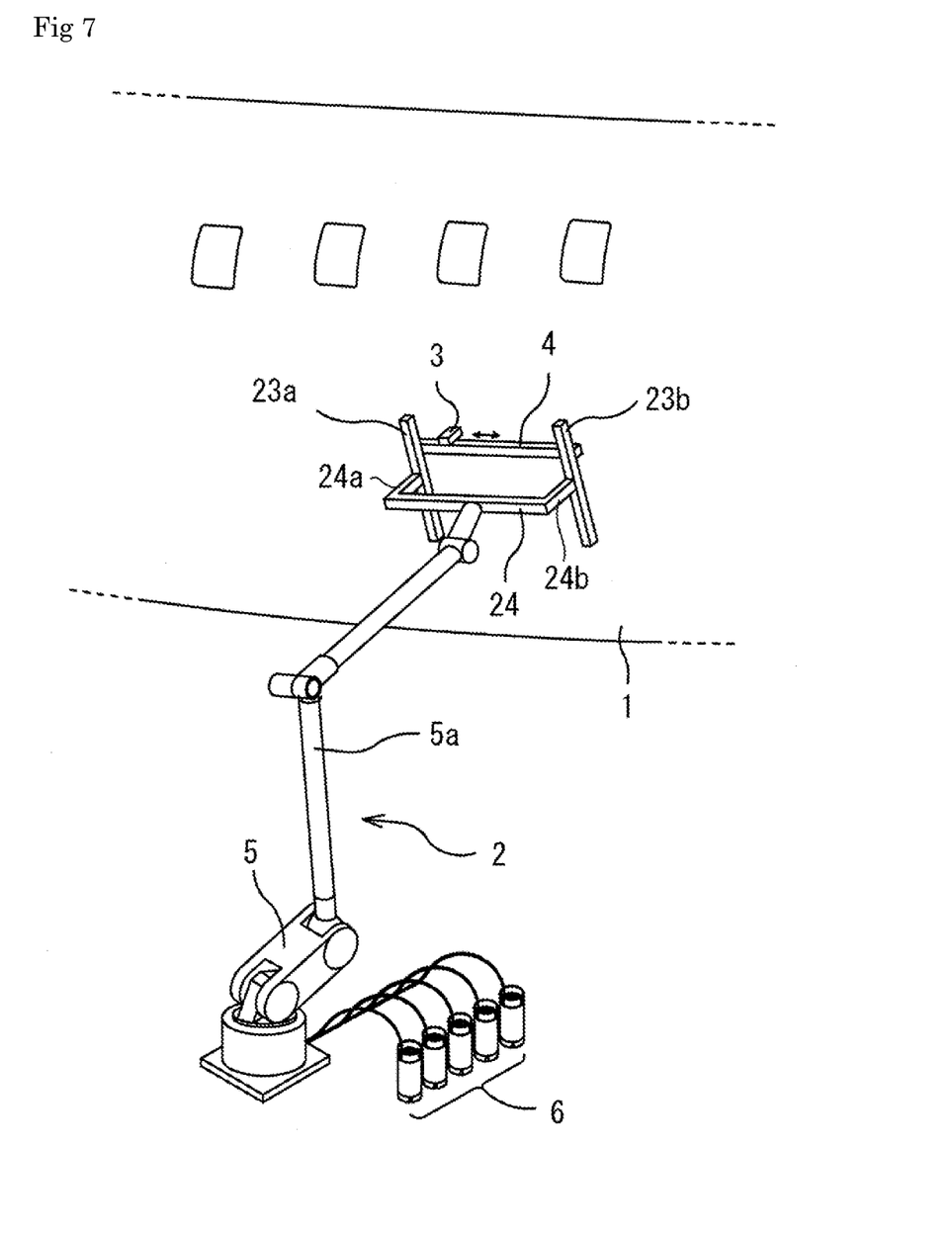
FIG. 7 is a schematic perspective view illustrating a printing apparatus according to a third embodiment of the present invention.

Furthermore, the printing apparatus 2 according to the third embodiment illustrated in FIG. 7 is configured in such a manner that a fork-shaped support member 24 having a pair of bifurcated parts is provided in the robot arm 5a, a vertical linear rail 23a is attached to a leading end of a left part 24a of the support member 24 and a vertical linear rail 23b is attached to a leading end of a right part 24b thereof so as to be parallel to each other, and both ends of the linear rail 4 holding thereon the head array 3 are mounted on the two vertical linear rails 23a and 23b, respectively so that the rail 4 is bridged over the vertical linear rails. Moreover, it is possible to move the head array 3 from a certain line to the next line by driving the vertical linear rails 23a and 23b.

In the third embodiment, the average 200 ms is required to move the head array 3 to the next line as in the first embodiment, but since the head array can be moved at the average 50 ms, it is possible to make the printing speed faster. In the afore-described example of printing of 1 m² curved surface, the speed becomes faster by about 590 sec as follows.

3,937 times 0.05 sec=196.9 sec 787.4 sec minus 196.9 sec=590.5 sec

As described above, although the several preferred embodiments of the present invention have been described, the present invention is not intended to be limited to the above-described embodiments, and it is to be understood that various modifications and variations may be made within the scope and sprit of the present invention described in the appended claims.

REFERENCE NUMERAL LIST 1 printed surface
2 printing apparatus
3 head array
4 linear rail
5 multi-articulated robot
5a robot arm
6 ink tank groups
7 robot arm controller
8 controller
9 robot positioning processing unit
10 nozzle drive unit
11 linear rail drive unit
12 image processing unit
13 PC
14 printed surface DB
15 image DB
16 nozzle group assembly
17 nozzle drive signal
18 tube element
19 air compressor
20 air regulator
21 ink tank pressurized air pipe
22 orthogonal linear rail
23a, 23b vertical linear rail
24 support member
24a, 24b bifurcated parts

The invention claimed is:

1. A printing apparatus for printing a pattern and/or a character by performing ejection of a predetermined ink to a predetermined targeted position of a curved printed surface, comprising:
    a head array having provided therein a plurality of inkjet nozzles configured to eject an ink toward a remote position by supplying pressurized air to an ink tank filled with the ink to thereby apply thereto high-pressure air;
    a linear rail configured to allow the head array to make linear reciprocation therealong;
    a multi-articulated robot provided with a robot arm arranged for appropriately moving the linear rail to a predetermined position and for holding the linear rail at the predetermined position;
    a robot arm controller configured to control driving of the robot arm on the basis of position information; and
    a controller configured to supply the position information to the robot arm controller, and to perform driving control of the predetermined inkjet nozzle of the head array in association with the position information.

2. The printing apparatus according to claim 1, wherein the linear rail is provided with two rails that are orthogonal to one another.

3. The printing apparatus according to claim 1, wherein the linear rail is a support member attached to the robot arm, and is movably mounted on two vertical linear rails that are attached to right and left leading ends of a fork-shaped support member so as to be parallel to one another, the fork-shaped support member having two bifurcated parts thereof.

* * * * *